Sept. 25, 1962  O. W. SMITH  3,055,677
VEHICLE WHEEL SUSPENSION
Filed Oct. 3, 1960  4 Sheets-Sheet 1
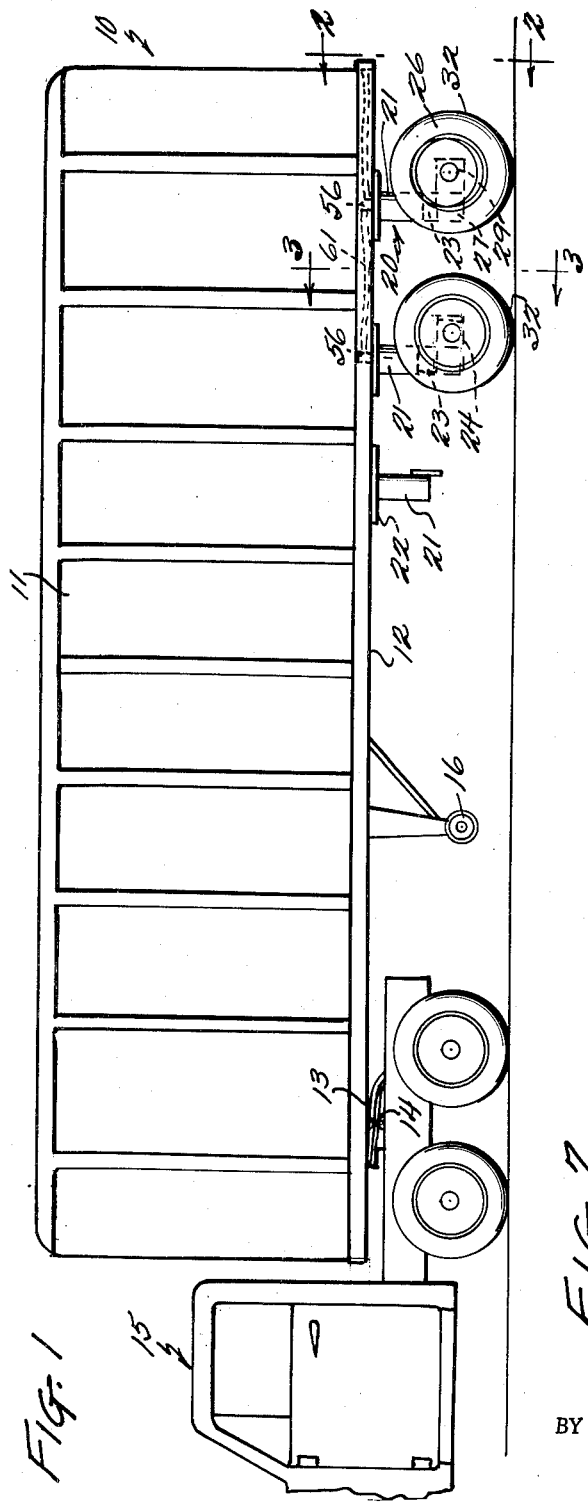
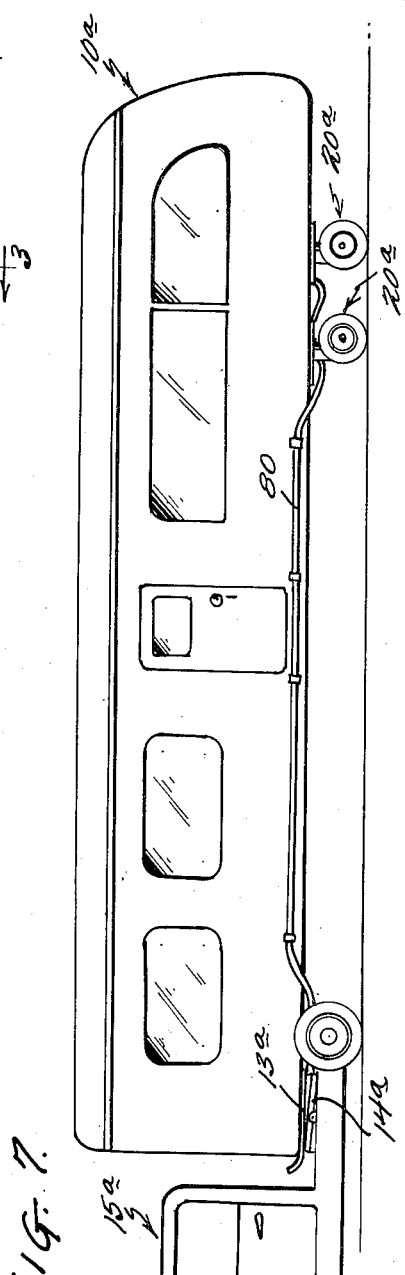
INVENTOR
OTHO W. SMITH
BY Kimmel & Crowell
ATTORNEYS Sept. 25, 1962
O. W. SMITH
3,055,677
VEHICLE WHEEL SUSPENSION
Filed Oct. 3, 1960
4 Sheets-Sheet 2
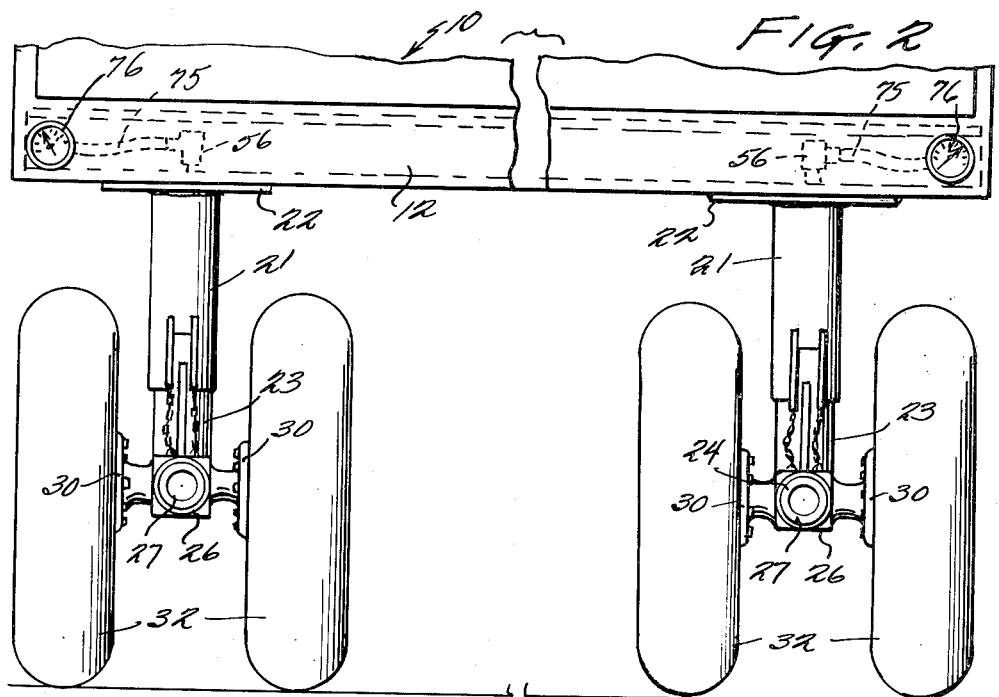
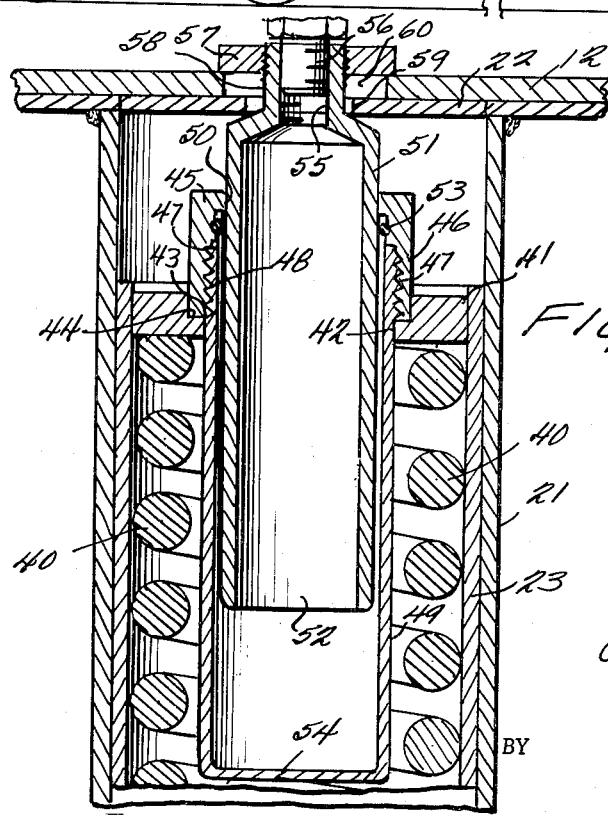
INVENTOR
OTHO W. SMITH
BY
Kimmel & Crowell
ATTORNEYS

INVENTOR
OTHO W. SMITH

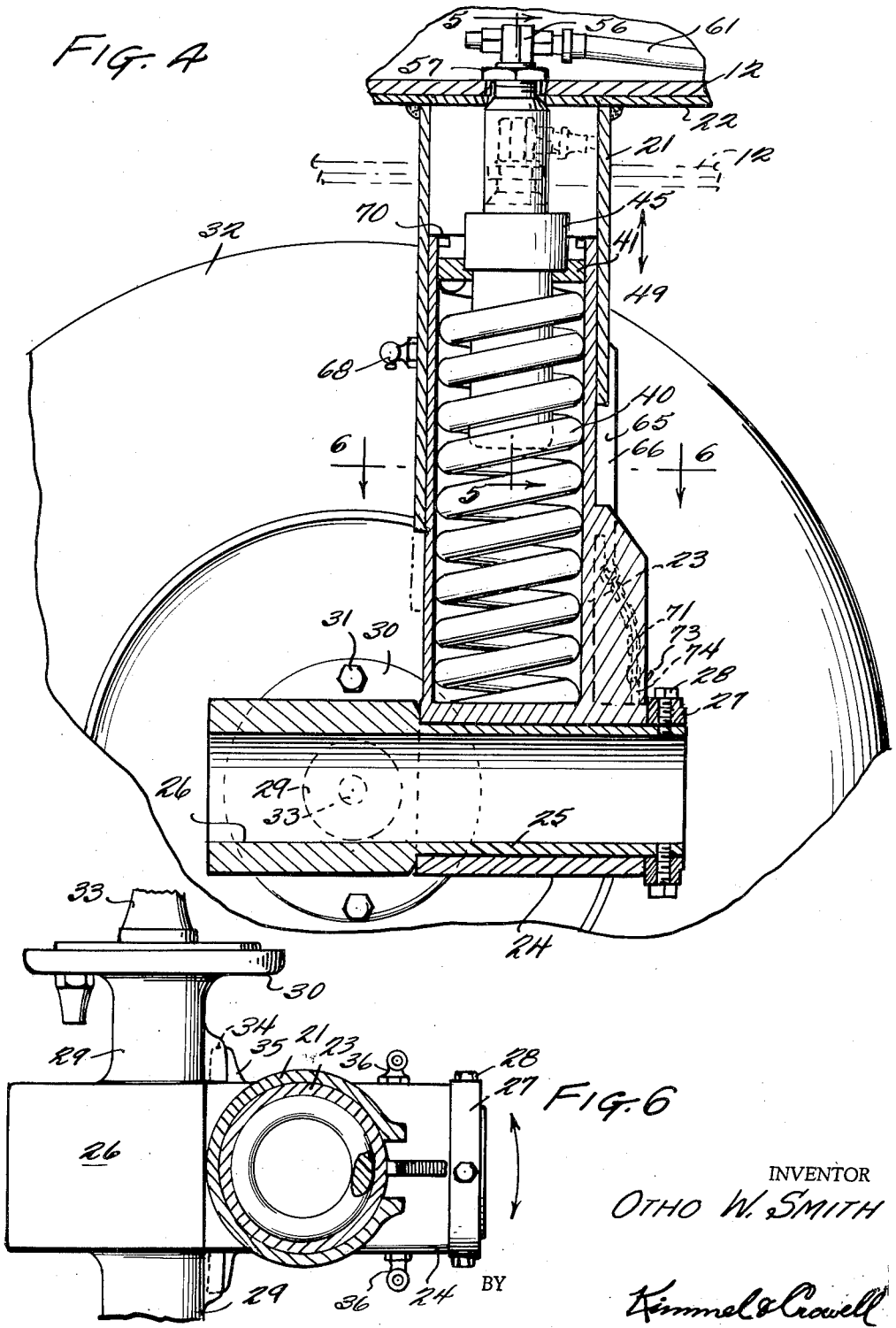

United States Patent Office 3,055,677
Patented Sept. 25, 1962

3,055,677
VEHICLE WHEEL SUSPENSION
Otho W. Smith, 33 Oolitic Road, Bedford, Ind.
Filed Oct. 3, 1960, Ser. No. 60,136
6 Claims. (Cl. 280—104.5)

This invention relates to vehicle wheel suspension and more particularly to an improved individual wheel or wheel unit suspension for tractor trailers, house trailers, trucks or other vehicles wherein it is desired to provide an individual wheel unit suspension for non-driving and non-steering wheels.

A primary object of the invention is the provision of improved means for the individual suspension of a wheel or wheel unit including a pair of concentric tubular members containing a heavy duty compression spring having one end abutting a wheel support unit and the other end engaging a hydraulically adjustable seat.

A further object of the invention is the provision of a wheel suspension of this character comprised of a pair of spaced wheels mounted on an axle, the axle being supported by a spring hydraulic arrangement as above specified, wherein limited lateral play of the axle mounting is permitted as well as limited rotative movement about a vertical axis.

A further important object of the invention is the provision of vehicle wheel suspension of this character wherein a plurality of wheel units may be aligned longitudinally of the vehicle with equalizing means being provided between longitudinally adjacent units for the hydraulically adjustable spring seats.

A more specific object of the invention resides in the provision of a device of this character having relatively few moving parts, thus reducing wear and replacement costs.

Still another object of the invention is the provision of an individual wheel unit suspension which by continuously equalizing the effective load on each wheel or unit will result in uniform and consequently minimum wear on the several tires of the vehicle.

Still another object of the invention consists in the provision of an improvement over my prior Patent 2,825,577, dated March 4, 1958, entitled "Trailer Axle Spring Suspension," in that the instant invention contemplates individual mounting of wheels or wheel units rather than mounting complete axles.

Still another object of the invention is the provision of a device of this character which may be readily applied to any object or article which it is desired to tow, such as, for example, large tanks or other bulky objects normally difficult to carry on tractor trailers.

A further object of the invention is the provision of an improved vehicle wheel suspension which is sturdy and durable in construction, reliable and efficient in operation, and relatively simple and inexpensive to manufacture, assemble, utilize and maintain.

Still other objects provide the combinations of elements, arrangements of parts and features of construction.

Other objects will in part be obvious and in part be pointed out hereinafter and disclosed in the accompanying drawings, wherein there are shown preferred embodiments of this inventive concept.

In the drawings:

FIGURE 1 is a side elevational view of a tractor trailer embodying one form of the instant invention;

FIGURE 2 is an enlarged fragmentary end elevational view partially broken away, taken substantially along the line 2—2 of FIGURE 1 as viewed in the direction indicated by the arrows;

FIGURE 4 is a sectional view taken substantially along the line 4—4 of FIGURE 3 as viewed in the direction indicated by the arrows;

FIGURE 5 is an enlarged sectional view taken substantially along the line 5—5 of FIGURE 4 as viewed in the direction indicated by the arrows;

FIGURE 6 is a sectional view taken substantially along the line 6—6 of FIGURE 4 and viewed in the direction indicated by the arrows; and FIGURE 7 is a view similar to FIGURE 1 showing the wheel suspension of the instant invention as applied to a house trailer.

Similar reference characters refer to similar parts throughout the several views of the drawings.

Figure 3:
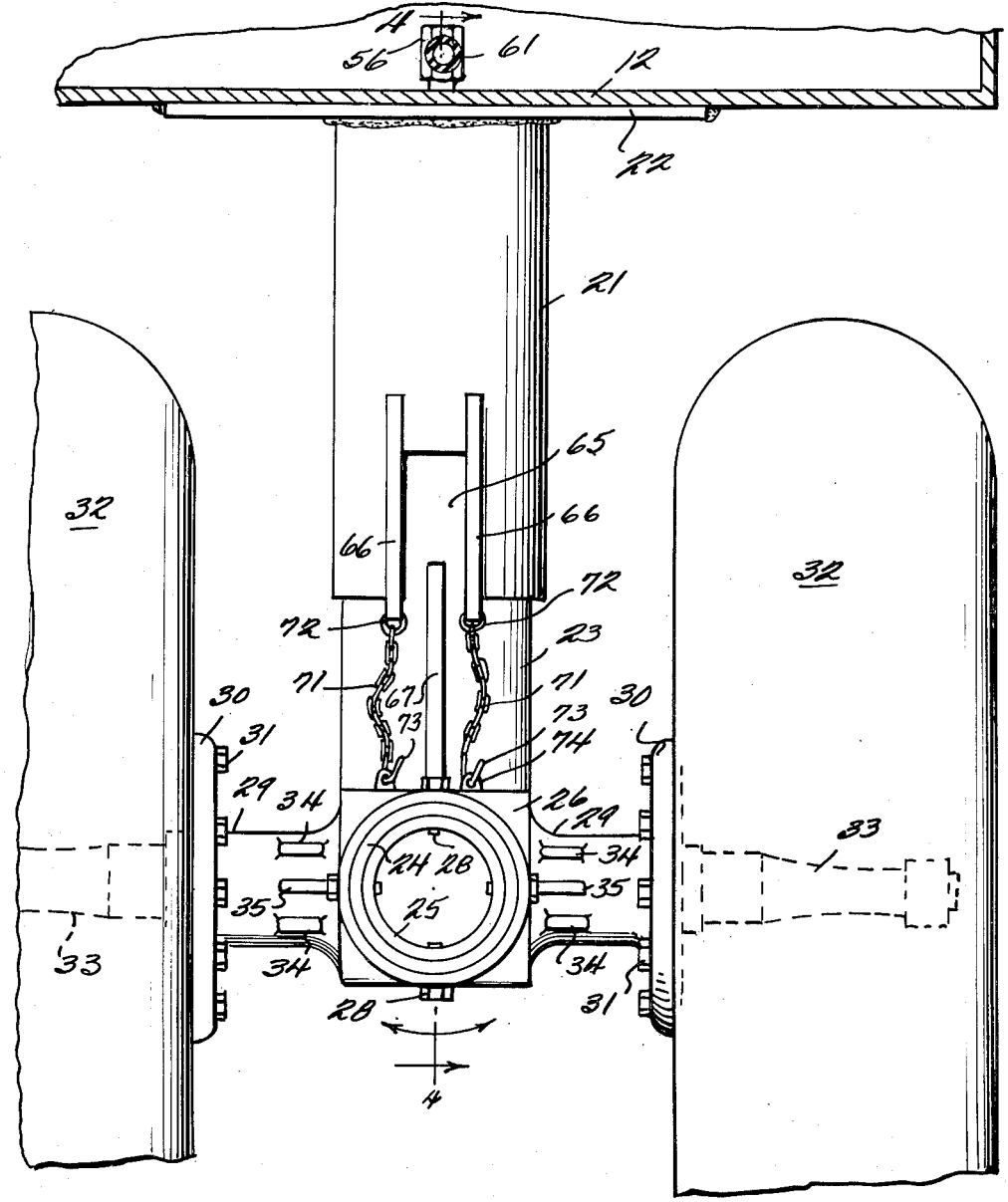
FIGURE 3 is an enlarged fragmentary sectional view taken substantially along the line 3—3 of FIGURE 1 as viewed in the direction indicated by the arrows.

Having reference now to the drawings in detail and more particularly to FIGURE 1, there is generally indicated at 10 a tractor trailer which comprises body 11, a base or floor 12, the latter carrying on its under side a connection 13 engageable with the fifth wheel 14 of a conventional tractor or tow vehicle generally indicated at 15. The usual front end supporting wheel 16 is provided adjacent the forward end of the truck body.

The device of the instant invention is generally indicated at 20 and comprises a number of tubular supports 21 each of which depends from base 22 which is suitably welded or otherwise rigidly affixed to the under side of the truck body, there being at least one tube on each side, and preferably two to three, so that the number of wheels or wheel units supporting the trailer body may be varied in accordance with the load or weight thereof.

As best shown in FIGURES 4 and 5, a tubular piston 23 is concentrically mounted in telescopic relation to the interior of a selected number of pairs of tubes 21. Integrally associated with the lower end of piston 23 is a sleeve 24 which is rotatably mounted on the reduced tubular end 25 of a hollow axle supporting member 26. A collar 27 is secured to the projecting end of reduced portion 25 as by means of bolts 28 or the like to retain sleeve 24 in position.

A pair of stub axles 29 project laterally from axle supporting member 26 and are provided with mounting plates 30 to which are bolted as by means of bolts 31 two wheel assemblies generally indicated at 32 which include the conventional brake drums, hubs, rims and other conventional elements (not shown), the assemblies being mounted on conventional spindles 33 (see FIGURE 3).

As best shown in FIGURE 3 each stub axle is provided with a pair of spaced lugs 34 extending substantially perpendicularly therefrom. Between each pair of spaced lugs 34 extends a lug 35 which is carried by sleeve 24. The cooperation between lugs 34 and 35 limit rotative movement of the axle mounting member 26 about a longitudinal horizontal axis. The direction of rotative movement of the axle mounting member 26 is shown by the arrows.

Suitable grease fittings 36 extend through sleeve 24 at selected points for lubricating the parts.

Referring now more particularly to FIGURES 4 and 5, it will be seen that there is provided interiorly of piston 23 a relatively heavy compression coil spring 40, the lower end of which seats against the top of sleeve 24. The upper end of spring 40 seats against a plate or disc 41 which is vertically slidable interiorly of piston 23. Disc 41 has a central aperture 42 therein with a countersunk portion 43 forming a shoulder 44 against which seats the lower edge of a flange 46 which comprises a part of a cap 45. Flange 46 is interiorly threaded at 47 and engages corresponding external threads 48 on the upper extremity of a lower hydraulic cylinder 49. Cap 45 is apertured as at 50 to permit the passage therethrough of an upper hydraulic cylinder member 51, which is open at its lower end as at 52 and is slidably movable within the cylinder 49. A suitable sealing gasket 53 is provided interiorly of cap 45 to provide a fluid-tight seal. The bottom of cylinder 49 is closed as at 54, while the top of cylinder 51 has a reduced neck portion 58 which is provided with a threaded opening 55 in which engages the end of a fitting 56, which is secured in position by means of a lock nut 57. The reduced neck 58 extends through a suitable opening 59 in plate 22 and an aligned opening 60 in truck bottom 12 and is connected to a line 61. Line 61 extends, as best shown in FIGURE 1, between adjacent suspension members in longitudinal alignment on the same side of the vehicle, the arrangement being such that when the rearmost wheel, for example, strikes an obstruction the pressure of the spring 40 causes a rise of plate 41 and a consequent raising of outer hydraulic cylinder 49 compressing the fluid therein. This compressed fluid passes through the line 61 into the next adjacent cylinder which causes a corresponding expansion of cylinder 49 relative to cylinder 51 which results in lowering plate 41 in the adjacent cylinder, thus equalizing the load as the vehicle passes over an obstruction. The opposite reaction is obvious.

In order to provide for limited rotative movement of the wheel assembly comprised of axle supporting member 26, axle 29 and wheel assembly 32, a slot 65 (see FIGURE 3) extends upwardly from the base of tubular member 21 and is provided on opposite sides thereof with reinforcing ribs 66. Ribs 66 serve as stops for a rib or flange 67 carried by piston 23, so that limited rotative movement may be had by piston 23 and its associated mechanism within tubular member 21.

Grease fittings 68 may be provided at appropriate locations to lubricate the surfaces of piston 23 and tubular member 21.

In order to prevent the complete escape of plate 41 from piston 23, a suitable stop flange 70 is provided at the top of piston 23. Similarly, in order to prevent the complete withdrawal of piston 23 from tubular member 21 chains 71 are secured at one end to eyes 72 which are secured to the lower extremities of ribs 66, and at their other ends are provided with hooks 73 which engage suitable apertured lugs 74 affixed to axle supporting member 26. Hooks 73 may be readily released to permit attachment of any selected wheel units to any selected pairs of tubes 21 so that the trailer or vehicle of FIG. 1 may carry either one, two or three pairs of wheel units in accordance with the load. Obviously in the case of a single pair of wheel units the hydraulic assembly may be disconnected since equalization is unnecessary. Equally obviously, when a third pair of wheel units is added additional fluid connections 61 serve to equalize the entire system.

Each fitting 56 is connected by a line 75 to an individual pressure gage 76 (see FIGURE 2) in position to be readily visible to the vehicle operator so that the load on each individual wheel assembly may be determined at a glance, thus obviating the necessity of redistribution of weight in the truck after initial loading.

It should also be pointed out here that in the event a tire or a wheel change becomes necessary any axle support 26 and its associated wheels 32 may be removed from the vehicle and wheeled to a convenient position for repair merely by jacking up the vehicle body and removing the bolts 28 which permits removal of the collar 27, whereupon tubular extension 25 may be slid forwardly and removed entirely from its associated sleeve 24.

FIGURE 7 discloses a modified form of construction wherein a house trailer 10a is provided with a plurality of individual wheel unit assemblies 20a which are substantially identical in construction to those previously described with the exception of the fact that the wheels are of smaller diameter to compensate with the size of the house trailer. Suitable brake line 80 extends to the rear wheels of the house trailer which is provided at its forward end with seating device 13a adapted to engage the fifth wheel 14a of a tow vehicle 15a. Any desired brake or other connections (not shown) are also provided for the wheel units of the tractor trailer of FIGURE 1.

From the foregoing it will now be seen that there is herein provided an improved individual wheel suspension for vehicles which permits a substantially automatic equalization of the load during travel, which maintains the floor of the vehicle body substantially level regardless of depressions or bumps in the road, which insures, by virtue of the associated individual pressure gages, uniform distribution of load per wheel, which may be readily disassembled for tire repair or other servicing, and which accomplishes all of the objects of this invention and others, including many adavntages of great practical utility and commercial importance.

As many embodiments may be made of this inventive concept and as many modifications may be made in the embodiment herein described, it is to be understood that all matter herein is to be interpreted as merely illustrative and not in a limiting sense.

I claim:

1. In combination with a vehicle body having a floor, at least two longitudinally aligned pairs of transversely aligned sleeves secured to the underside thereof, pistons slidable in each of said transversely aligned sleeves, a bore in the lower ends of said pistons, axle supporting members secured in the bores of said pistons for rotative movement with respect thereto, means to limit said rotative movement, axles carried by said axle supporting members, wheel assemblies carried by said axles, compression springs disposed in said pistons, one end of said springs engaging said pistons adjacent said bores, hydraulically adjustable seat members slidable in said pistons and engaging the other ends of said compression springs, and expansible chamber hydraulic cylinders in each of said transversely aligned sleeves concentrically disposed with respect to said pistons, compression springs and adjustable seat members.

2. The combination as defined in claim 1 including a releasable connection between said axle supporting members and said pistons.

3. The combination as defined in claim 1 wherein said hydraulically adjustable seat members are secured to said expansible chamber hydraulic cylinders.

4. The combination as defined in claim 1 which further includes a hydraulic fluid connection between the expansible chamber hydraulic cylinders of adjacent longitudinally aligned sleeves.

5. The combination as defined in claim 1 wherein said pistons are mounted for rotative movement in said transversely aligned sleeves and means to limit said rotative movement.

6. In combination with a vehicle body having a floor, at least one pair of transversely aligned sleeves secured to the underside thereof, pistons slidable in each of said transversely aligned sleeves, axle supporting members secured to the lower end of said pistons, said axle supporting members being secured to said pistons for rotative movement about a horizontal axis with respect thereto, means on said pistons and said axle supporting members for limiting said rotative movement, an axle carried by said axle supporting members, a wheel assembly carried by said axle, spring means disposed within said pistons and engaging the same at one end thereof, and hydraulically adjustable seats slidable in said pistons engaging the other end of said spring means.

References Cited in the file of this patent

UNITED STATES PATENTS

| | | |
|---|---|---|
| 2,094,882 | Garnett | Oct. 5, 1937 |
| 2,442,354 | Gordon | June 1, 1948 |
| 2,687,311 | Nallinger | Aug. 24, 1954 |
| 2,764,421 | Ronning | Sept. 25, 1956 |

FOREIGN PATENTS

| | | |
|---|---|---|
| 495,309 | Belgium | May 15, 1950 |
| 612,843 | Germany | May 6, 1935 |